United States Patent
Barfuss et al.

(10) Patent No.: US 7,246,195 B2
(45) Date of Patent: Jul. 17, 2007

(54) DATA STORAGE MANAGEMENT FOR FLASH MEMORY DEVICES

(75) Inventors: Dale Craig Barfuss, Pleasant Grove, UT (US); Suresh Nagarajan, Mather, CA (US)

(73) Assignee: Intel Corporation, Santa Clara, CA (US)

( * ) Notice: Subject to any disclaimer, the term of this patent is extended or adjusted under 35 U.S.C. 154(b) by 377 days.

(21) Appl. No.: 11/027,129

(22) Filed: Dec. 30, 2004

(65) Prior Publication Data
US 2006/0149893 A1 Jul. 6, 2006

(51) Int. Cl.
*G06F 12/00* (2006.01)
(52) U.S. Cl. ..................................... 711/103
(58) Field of Classification Search ............... 711/103, 711/154, 156, 165, 173
See application file for complete search history.

(56) References Cited

U.S. PATENT DOCUMENTS

| | | | | |
|---|---|---|---|---|
| 5,404,485 | A | * | 4/1995 | Ban .......................... 711/202 |
| 5,867,641 | A | * | 2/1999 | Jenett .......................... 714/7 |
| 7,093,071 | B2 | * | 8/2006 | Rudelic ..................... 711/118 |
| 7,155,560 | B2 | * | 12/2006 | McGrew et al. ........... 711/103 |
| 7,162,606 | B2 | * | 1/2007 | Wong et al. ............... 711/170 |
| 7,171,536 | B2 | * | 1/2007 | Chang et al. .............. 711/170 |

* cited by examiner

*Primary Examiner*—Hiep T. Nguyen
(74) *Attorney, Agent, or Firm*—Blakely, Sokoloff, Taylor & Zafman LLP

(57) ABSTRACT

Logical units of allocation may be designated as overhead and unallocated and made unavailable for use. During one or more write operations, when one or more logical unit is invalidated, one or more of the unallocated overhead logical units may be designated as available for use and one or more of the invalidated logical units may be designated as overhead.

23 Claims, 4 Drawing Sheets

| Initial Designations | | Subsequent Designations |
|---|---|---|
| Available/Unallocated | — 105 — | Valid |
| Available/Unallocated | — 110 — | Valid |
| Available/Unallocated | — 115 — | Valid |
| Available/Unallocated | — 120 — | Invalid/Overhead |
| Available/Unallocated | — 125 — | Valid |
| Available/Unallocated | — 130 — | Valid |
| Available/Unallocated | — 135 — | Invalid/Overhead |
| Available/Unallocated | — 140 — | Available/Unallocated |
| Overhead/Unallocated | — 190, 145 — | Available/Unallocated |
| Overhead/Unallocated | — 150 — | Available/Unallocated |
| Overhead/Unallocated | — 155 — | Overhead/Unallocated |
| Overhead/Unallocated | — 160 — | Overhead/Unallocated |

| Initial Designations | | Subsequent Designations |
|---|---|---|
| Available/Unallocated | — 105 — | Valid |
| Available/Unallocated | — 110 — | Valid |
| Available/Unallocated | — 115 — | Valid |
| Available/Unallocated | — 120 — | Invalid/Overhead |
| Available/Unallocated | — 125 — | Valid |
| Available/Unallocated | — 130 — | Valid |
| Available/Unallocated | — 135 — | Invalid/Overhead |
| Available/Unallocated | — 140 — | Available/Unallocated |
| Overhead/Unallocated | →190  145 — | Available/Unallocated |
| Overhead/Unallocated | — 150 — | Available/Unallocated |
| Overhead/Unallocated | — 155 — | Overhead/Unallocated |
| Overhead/Unallocated | — 160 — | Overhead/Unallocated |

Fig. 1

DATA STORAGE MANAGEMENT FOR FLASH MEMORY DEVICES

TECHNICAL FIELD

Embodiments of the invention relate to data storage management techniques for flash memory devices. More particularly, embodiments of the invention relate to management of the reclamation of dirty units of storage space within a flash memory device.

BACKGROUND

In a flash memory system, memory locations are grouped together as blocks. Memory locations within the blocks are consumed as data is written to memory locations within the blocks. A data storage system may be used to map logical memory locations to physical memory locations within the blocks.

As data is deleted the storage space previously allocated for this data is flagged as "dirty" or invalid. When data is overwritten, or appended to, additional unallocated space is consumed and the space previously used may be flagged as dirty. Before the dirty space can be reused the entire block in which the dirty space resides must be erased. If there is still valid data within an erase block that data must first be moved to another block and all references to its location must be updated before an erase can be preformed.

Once this process has been completed the previously unusable dirty space is reclaimed as unallocated space available for reuse. This process of reclaiming dirty space within a block may be, depending upon the type of flash device employed, NOR/NAND, and the dynamics of the storage system itself, relatively time consuming, and has a negative effect on sustained write throughput performance especially as the data within a flash data storage system volume nears capacity such that dirtied space must be reclaimed before a write operation can be completed.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 1 is a block diagram of a portion of a memory having multiple logical units.

DETAILED DESCRIPTION

Figure 2:
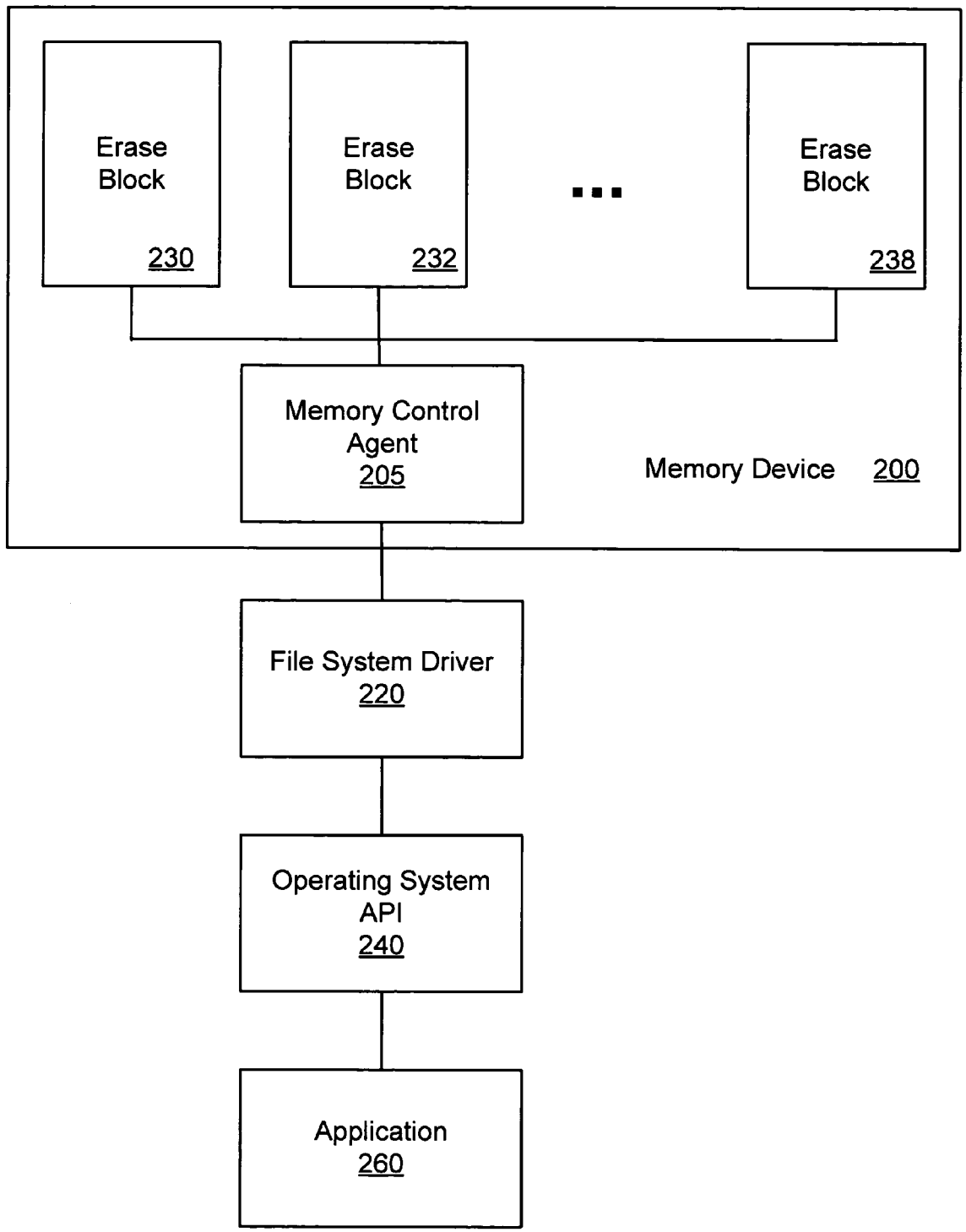
FIG. 2 is a block diagram of one embodiment of a system hierarchy that may allow management of multiple logical units including overhead logical units.

In the following description, numerous specific details are set forth. However, embodiments of the invention may be practiced without these specific details. In other instances, well-known circuits, structures and techniques have not been shown in detail in order not to obscure the understanding of this description.

Described herein is a technique that may reduce the frequency of erase block reclaims, which may improve sustained data storage system throughput. In one embodiment, one or more logical units (e.g., blocks) may be logically designated as overhead and unallocated during one or more write operations. In one embodiment, logical units are the smallest block of memory that may be allocated for use. For example, if a logical unit includes 1 Kbytes of memory and 100 bytes of data are to be written, a full logical unit is allocated to store the 100 bytes of data.

When one or more logical units are invalidated, one or more of the unallocated overhead logical units may be logically designated as available for use and one or more of the invalidated logical units may be logically designated as overhead. This use of overhead logical units may postpone reclamation operations, which may improve the sustained write throughput of the system.

FIG. 1 is a block diagram of a portion of a memory having multiple logical units. The logical units of FIG. 1 may correspond to any logical grouping of memory locations (e.g., one byte, 4 bytes, 8 bytes, 16 bytes). In one embodiment, the logical units may all be the same size.

FIG. 1 includes an initial designation for the portion of memory as well as a subsequent designation after which data may have been written to memory and marked invalid or dirty. In the example of FIG. 1, logical units of allocation 105 through 140 may be initially designated as available and unallocated (labeled "available/unallocated"). According to the initial designation logical units 105 through 140 are available for storage of data.

Logical units 145 through 160 may be initially designated as unallocated overhead units (labeled "overhead/unallocated"). In one embodiment, the overhead units may be reserved for later allocation. Reserving the overhead units for later allocation may allow reclamation of logical units to be postponed, which may allow memory throughput to be increased.

After a period of time data may be written to one or more of the available logical units. In the example of FIG. 1, valid data may have been written to logical units 105, 110, 115 125 and 130. The data written to logical units 120 and 135 may have been invalidated for any number of reasons. Logical unit 140 may remain with the available/unallocated designation pending access by an application.

In response to the invalidation of logical units 120 and 135, the designation of logical units 120 and 135 may be changed to invalid/overhead and the designation of logical units 145 and 150 may be changed to available/unallocated to replace logical units 120 and 135 in the operation of the erase block. One result of the use of overhead logical units as described with respect to FIG. 1 is that reclamation operations may be postponed, which may result in an improvement to overall sustained data storage system throughput.

FIG. 2 is a block diagram of one embodiment of a system hierarchy that may allow management of multiple logical units including overhead logical units. Memory device 200 may be, for example, a flash memory device. In one embodiment, memory device 200 may be a NOR flash memory device; however, other types of memory devices (e.g., NAND flash memory) may also be applicable. In one embodiment, memory device 200 includes one or more erase blocks (230, 232, 238) that operate as described above. The erase blocks may be coupled with memory control agent 205.

In one embodiment, memory control agent 205 performs addressing operations and/or ECC operations, if necessary. In one embodiment, memory control agent 205 is implemented as hardware circuitry within memory device 200. In alternate embodiments, some or all of the functionality of memory control agent 205 may be implemented as firmware and/or software.

In one embodiment, memory control agent is communicatively coupled with file system driver 220. In general, file system driver 220 provides the ability for a host system to interact with a specific hardware component (i.e., memory system 200). File system driver 220 may be a combination of software and/or firmware that is executed by a processor of the host system that interacts with memory device 200. In one embodiment, the address translation operations described herein are performed by file system driver 220. In alternate embodiments, other components, for example, memory control agent 205 may perform some or all of the address translation and related operations described herein.

In one embodiment, file system driver 220 may determine timing for a reclamation operation on one or more of the erase blocks. In one embodiment, file system driver 220 causes the number of dirty logical units in one or more of the erase blocks to be counted and based, at least in part, on the number of dirty logical units in the erase block may cause a reclamation operation to be initiated.

In one embodiment, operating system application program interface (API) 240 is communicatively coupled with file system driver 220. In general operating system API provides a software interface between an operating system executed by the host system and file system driver 220. The general functionality of operating system drivers is known in the art and therefore not described in greater detail.

In one embodiment, application 260 is communicatively coupled with operating system API 240 to generate requests for access to memory system 200. Application 260 may be any type of application known in the art that may interact with memory system 200.

Figure 3:
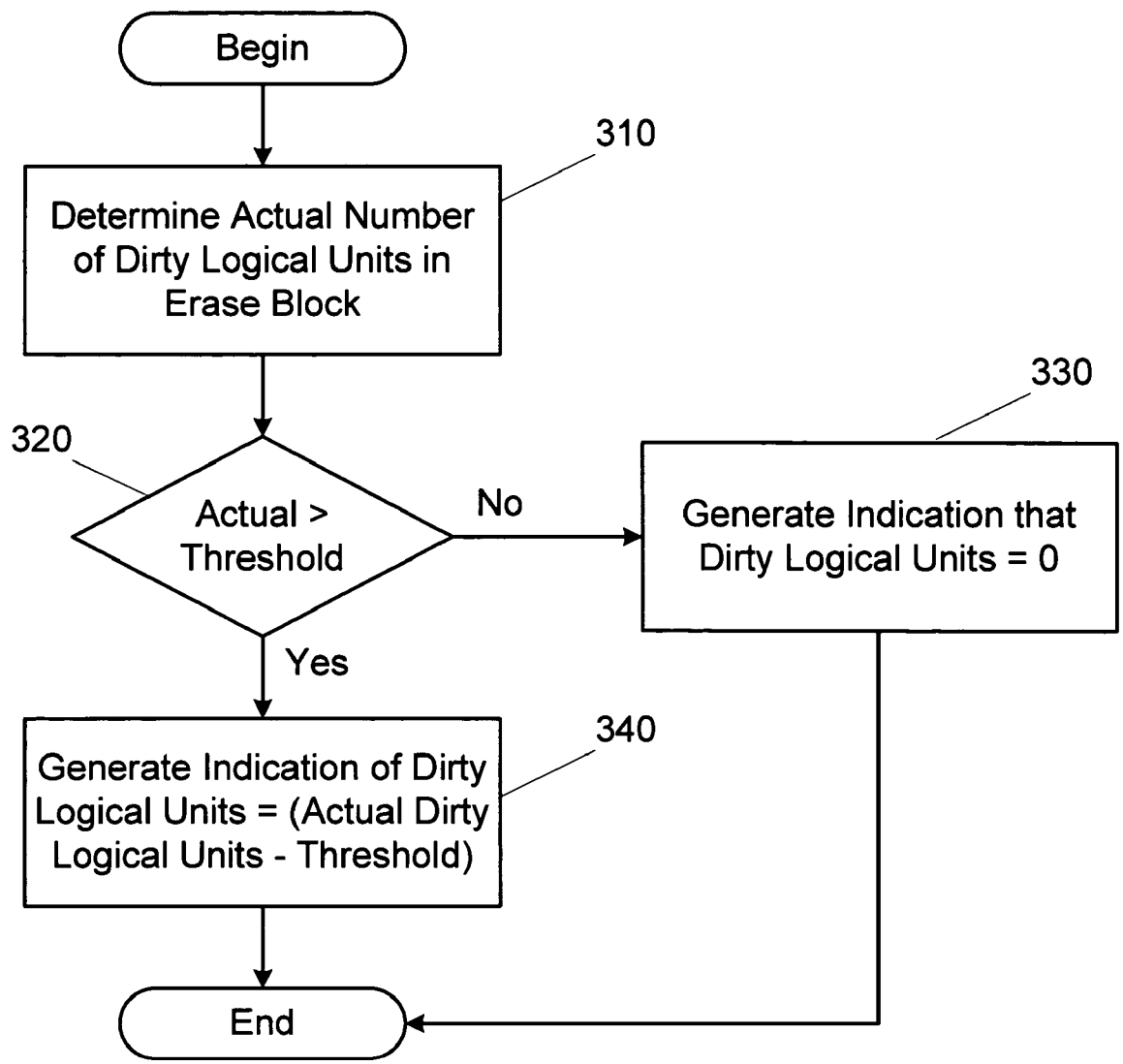
FIG. 3 is a flow diagram of one embodiment of a technique for determining a number of dirty logical units in a memory system erase block.

FIG. 3 is a flow diagram of one embodiment of a technique for determining a number of dirty logical units in a memory system erase block. The example technique described with respect to FIG. 3 may result in an indication of the number of dirty or invalid logical units in an erase block (or other grouping of logical units) to be different than the actual number of dirty or invalid logical units in the erase block, which may result in a delay in initiation of a reclamation operation, as discussed above.

The number of dirty (or invalid) logical units in the erase block may be determined, 310. This may be performed by, for example, a memory controller, a state machine or any other component having access to the storage device. The actual number of dirty logical units may be compared with a pre-selected threshold value to determine whether the number of dirty logical units equals or exceeds the threshold value, 320. In one embodiment, the threshold value is determined based, at least in part, on the number of initially designated overhead logical units that may be subsequently designated for use.

If the number of dirty logical units exceeds the threshold value, an indication of a number of logical units is generated, 340. In one embodiment, the indication of the number of logical units is the number of actual dirty logical units minus the threshold value. By artificially decreasing the number of dirty logical units as interpreted by a control unit external to the erase block, reclamation operations may be delayed to increase sustained system write throughput.

If the number of dirty logical units is less than, or equal to, the threshold value, 320, an indication of zero dirty logical units may be generated, 330. By generating an external indication of zero logical units until the actual number of logical units is equal to or greater than the threshold value, the reclamation operation may be delayed. That is, the overhead logical units may be used for data storage purposes before the reclamation operation is initiated.

Figure 4:
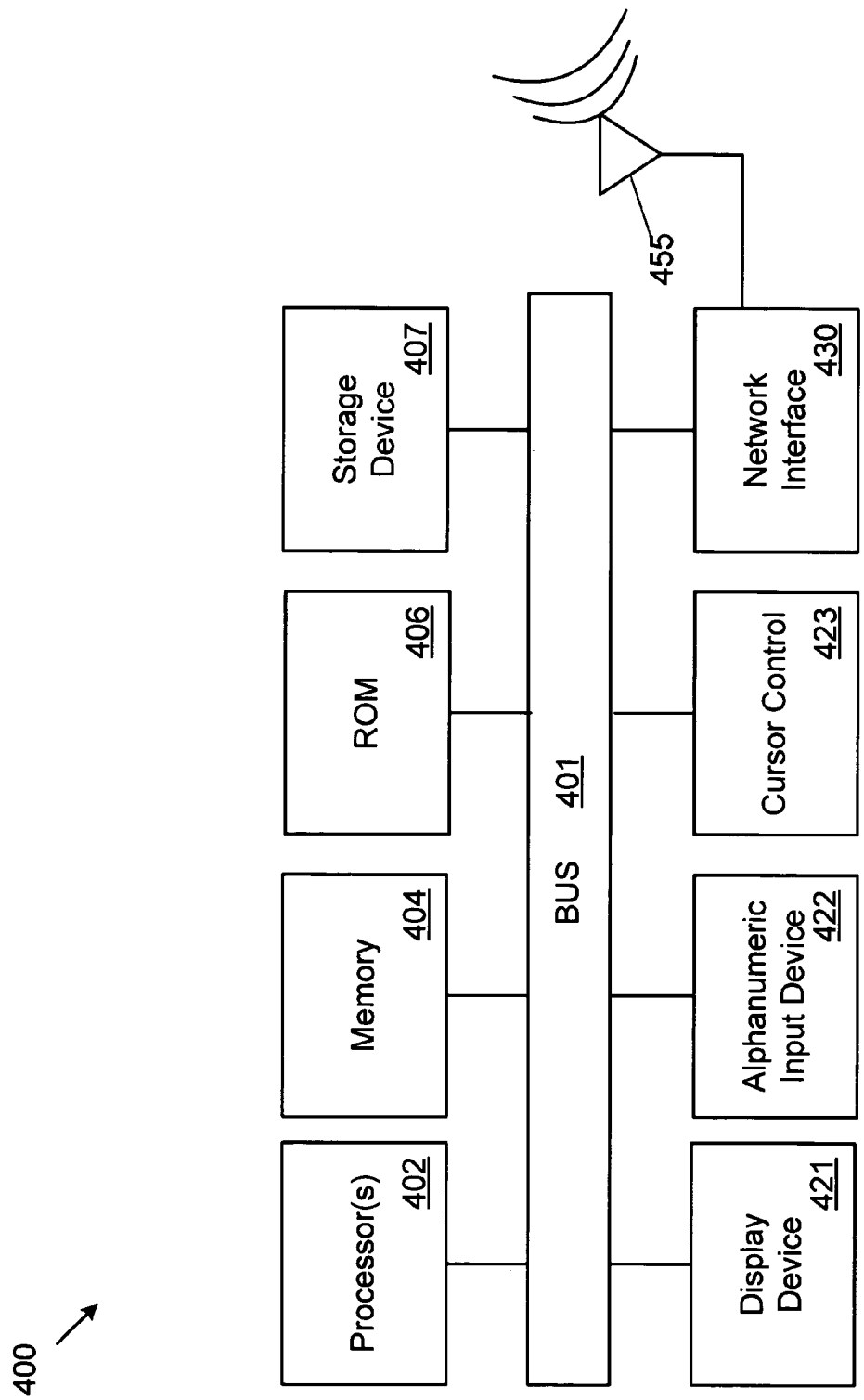
FIG. 4 is a block diagram of one embodiment of an electronic system.

FIG. 4 is a block diagram of one embodiment of an electronic system. The electronic system illustrated in FIG. 4 is intended to represent a range of electronic systems including, for example, desktop computer systems, laptop computer systems, cellular telephones, personal digital assistants (PDAs) including cellular-enabled PDAs, set top boxes. Alternative computer systems can include more, fewer and/or different components.

Electronic system 400 includes bus 401 or other communication device to communicate information, and processor 402 coupled to bus 401 that may process information. While electronic system 400 is illustrated with a single processor, electronic system 400 may include multiple processors and/or co-processors. Electronic system 400 further may include random access memory (RAM) or other dynamic storage device 404 (referred to as main memory), coupled to bus 401 and may store information and instructions that may be executed by processor 402. Main memory 404 may also be used to store temporary variables or other intermediate information during execution of instructions by processor 402.

Electronic system 400 may also include read only memory (ROM) and/or other static storage device 406 coupled to bus 401 that may store static information and instructions for processor 402. Data storage device 407 may be coupled to bus 401 to store information and instructions. Data storage device 407 such as a magnetic disk or optical disc and corresponding drive may be coupled to electronic system 400.

Electronic system 400 may also be coupled via bus 401 to display device 421, such as a cathode ray tube (CRT) or liquid crystal display (LCD), to display information to a user. Alphanumeric input device 422, including alphanumeric and other keys, may be coupled to bus 401 to communicate information and command selections to processor 402. Another type of user input device is cursor control 423, such as a mouse, a trackball, or cursor direction keys to communicate direction information and command selections to processor 402 and to control cursor movement on display 421. Electronic system 400 further may include network interface(s) 430 to provide access to a network, such as a local area network. Network interface(s) 430 may include, for example, a wireless network interface having antenna 455, which may represent one or more antenna(e). Antenna 455 may be a deployable antenna that is part of a removable card as described herein.

In one embodiment, network interface(s) 430 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4

GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
designating a first set of logical units in an erase block as units available for storing data;
designating a second set of logical units in the erase block as overhead units;
changing the designation of one or more of the second set of logical units from overhead units to units available for storing data in response to one or more of the first set of logical units being marked as dirty or invalid; and
changing the designation of the one or more of the first set of logical units marked as dirty or invalid from units available for storing data to overhead units.

2. The method of claim 1 wherein the logical units in the first set and the logical units in the second set are each equal to a predetermined fixed size.

3. The method of claim 1 wherein the erase block corresponds to a group of logical units in a flash memory device to be erased as a group.

4. The method of claim 2 wherein the flash memory device comprises a NOR flash memory device.

5. The method of claim 1 further comprising:
determining a number of logical units marked as dirty or invalid in the erase block;
determining whether the number of logical units marked as dirty or invalid exceeds a pre-selected threshold value;
generating an indication of zero logical units marked as dirty or invalid if the number of logical units marked as dirty or invalid is less then, or equal to, the threshold value; and
generating an indication of logical units marked as dirty or invalid as the number of logical units marked as dirty or invalid minus the threshold value.

6. The method of claim 4 wherein the threshold value is equal to the number of logical units in the second set of logical units.

7. The method of claim 4 further comprising performing a reclamation operation on the erase block if the indication of logical units marked as dirty or invalid exceeds a reclamation threshold value.

8. An apparatus comprising:
an array of memory cells grouped as multiple erase blocks, each erase block having multiple logical units;
a control agent coupled with the array of memory cells to control a state corresponding to each of the multiple logical units, wherein the control unit is configured to designate a first set of logical units in a selected erase block as units available for storing data, designate a second set of logical units in the erase block as overhead units, change the designation of one or more of the second set of logical units from overhead units to units available for storing data in response to one or more of the first set of logical units being marked as dirty or invalid, and change the designation of the one or more of the first set of logical units marked as dirty or invalid from units available for storing data to overhead units.

9. The apparatus of claim 8 wherein the logical units in the first set and the logical units in the second set are each equal to a predetermined fixed size.

10. The apparatus of claim 8 wherein the control agent comprises a file system driver.

11. The apparatus of claim 8 wherein the control agent comprises a memory control agent within a flash memory device.

12. The apparatus of claim 8 wherein the array of memory cells comprise NOR flash memory cells.

13. The apparatus of claim 8 wherein the control agent is further configured to determine a number of logical units marked as dirty or invalid in the erase block, determine whether the number of logical units marked as dirty or invalid equals or exceeds a pre-selected threshold value, generate an indication of zero logical units marked as dirty or invalid if the number of logical units marked as dirty or invalid is less then or equal to the threshold value, and generate an indication of logical units marked as dirty or invalid as the number of logical units marked as dirty or invalid minus the threshold value.

14. The apparatus of claim 13 wherein the threshold value is equal to the number of logical units in the second set of logical units.

15. The apparatus of claim 13 wherein the control agent is further configured to perform a reclamation operation on the erase block if the indication of logical units marked as dirty or invalid is equal to or exceeds a reclamation threshold value.

16. A system comprising:
a substantially omni-directional antenna;
a processor coupled with the antenna;
an array of memory cells grouped as multiple erase blocks, each erase block having multiple logical units;
a control agent coupled with the array of memory cells and the processor to control a state corresponding to each of the multiple logical units, wherein the control unit is configured to designate a first set of logical units in a selected erase block as units available for storing data, designate a second set of logical units in the erase block as overhead units, change the designation of one or more of the second set of logical units from overhead units to units available for storing data in response to one or more of the first set of logical units being marked as dirty or invalid, and change the designation of the one or more of the first set of logical units marked as dirty or invalid from units available for storing data to overhead units.

17. The system of claim 16 wherein the logical units in the first set and the logical units in the second set are each equal to a predetermined fixed size.

18. The system of claim 16 wherein the control agent comprises a file system driver.

19. The system of claim 16 wherein the control agent comprises a memory control agent within a flash memory device.

20. The system of claim 16 wherein the array of memory cells comprise NOR flash memory cells.

21. The system of claim 16 wherein the control agent is further configured to determine a number of logical units marked as dirty or invalid in the erase block, determine whether the number of logical units marked as dirty or invalid equals or exceeds a pre-selected threshold value, generate an indication of zero logical units marked as dirty or invalid if the number of logical units marked as dirty or invalid is less then or equal to the threshold value, and generate an indication of logical units marked as dirty or invalid as the number of logical units marked as dirty or invalid minus the threshold value.

22. The system of claim 16 wherein the threshold value is equal to the number of logical units in the second set of logical units.

23. The system of claim 16 wherein the control agent is further configured to perform a reclamation operation on the erase block if the indication of logical units marked as dirty or invalid is equal to or exceeds a reclamation threshold value.

* * * * *